United States Patent
Li

(10) Patent No.: US 12,332,521 B2
(45) Date of Patent: Jun. 17, 2025

(54) DISPLAY PANEL AND MANUFACTURING METHOD THEREOF

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Liang Li, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/440,722

(22) PCT Filed: Aug. 10, 2021

(86) PCT No.: PCT/CN2021/111664
§ 371 (c)(1),
(2) Date: Nov. 15, 2021

(87) PCT Pub. No.: WO2023/010589
PCT Pub. Date: Feb. 9, 2023

(65) Prior Publication Data
US 2024/0027838 A1    Jan. 25, 2024

(30) Foreign Application Priority Data
Aug. 2, 2021 (CN) .......................... 202110880621.3

(51) Int. Cl.
*G02F 1/1339*   (2006.01)
*G02F 1/1333*   (2006.01)
(Continued)

(52) U.S. Cl.
CPC ...... *G02F 1/1339* (2013.01); *G02F 1/133368* (2021.01); *G02F 1/133512* (2013.01); *G02F 1/136295* (2021.01); *G02F 2201/121* (2013.01)

(58) Field of Classification Search
CPC ............. G02F 1/0107; G02F 1/133707; G02F 1/1339; G02F 1/13392; G02F 1/13394;
(Continued)

(56) References Cited

U.S. PATENT DOCUMENTS 6,392,735 B1 * 5/2002 Tani ...................... G02F 1/1339
                                                                349/155
6,466,294 B1 * 10/2002 Yamagishi ............ G02F 1/1345
                                                                430/7
(Continued)

FOREIGN PATENT DOCUMENTS

CN         1832149 A        9/2006
CN       102169263 A        8/2011
(Continued)

OTHER PUBLICATIONS

Chinese Office Action issued in corresponding Chinese Patent Application No. 202110880621.3 dated Mar. 30, 2022, pp. 1-10.
(Continued)

*Primary Examiner* — Shan Liu
(74) *Attorney, Agent, or Firm* — PV IP PC; Wei Te Chung

(57) ABSTRACT

Disclosed are a display panel and a manufacturing method. In the display panel, the first substrate has a signal trace and an insulating protection layer, and the signal trace is positioned in the seal area, and the insulation protection layer covers the signal trace, and the insulation protection layer has an opening to expose the signal trace. A portion of the insulating protection layer located in the active area has a first thickness, and a portion of the insulating protection
(Continued)

layer located in the seal area has a second thickness, and the first thickness is greater than the second thickness.

15 Claims, 3 Drawing Sheets

(51) Int. Cl.
  *G02F 1/1335* (2006.01)
  *G02F 1/1362* (2006.01)
(58) Field of Classification Search
  CPC .. G02F 1/1341; G02F 1/161; G02F 1/133377; G02F 1/13396; G02F 1/13398; G02F 2001/13396; G02F 2001/13398; H01L 27/3246
  See application file for complete search history.

(56) References Cited

U.S. PATENT DOCUMENTS

| | | | | |
|---|---|---|---|---|
| 2006/0139556 A1* | 6/2006 | Ahn | ................ | G02F 1/1368 349/153 |
| 2010/0045912 A1 | 2/2010 | Chen et al. | | |
| 2011/0090445 A1* | 4/2011 | Kim | ................ | G02F 1/1339 349/139 |
| 2013/0321734 A1 | 12/2013 | Won et al. | | |
| 2017/0285424 A1* | 10/2017 | Kwak | ................ | G02F 1/1339 |
| 2020/0110295 A1* | 4/2020 | Huang | ............. | G02F 1/134309 |

FOREIGN PATENT DOCUMENTS

| | | | |
|---|---|---|---|
| CN | 102543896 | A | 7/2012 |
| CN | 108828845 | A | 11/2018 |
| CN | 109188764 | A | 1/2019 |
| CN | 109239998 | A | 1/2019 |
| CN | 208805659 | U | 4/2019 |
| CN | 110879493 | A | 3/2020 |
| CN | 110993609 | A * | 4/2020 |
| CN | 111176027 | A | 5/2020 |
| CN | 112684628 | A | 4/2021 |
| KR | 20050115670 | A | 12/2005 |

OTHER PUBLICATIONS

International Search Report in International application No. PCT/CN2021/111664, mailed on Feb. 24, 2022.
Written Opinion of the International Searching Authority in International application No. PCT/CN2021/111664, mailed on Feb. 24, 2022.

* cited by examiner

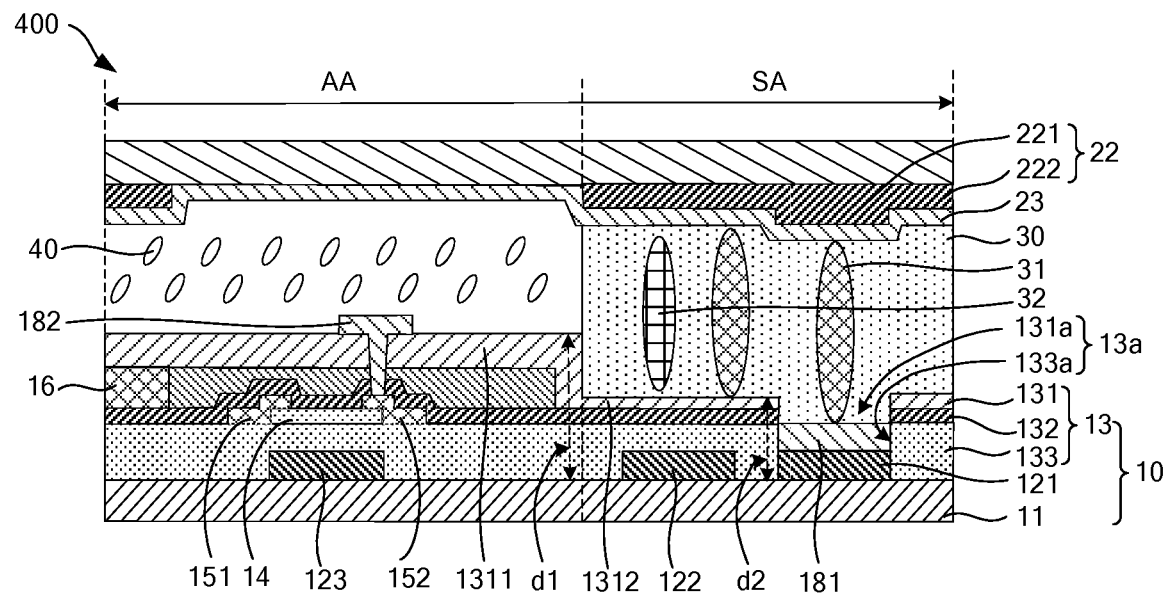

FIG. 5 providing a first substrate, and the first substrate has a signal trace and an insulating protection layer, and the signal trace is positioned in the seal area, and the insulation protection layer covers the signal trace, and the insulation protection layer has an opening, and the opening exposes the signal trace, and a portion of the insulating protection layer located in the active area has a first thickness, and a portion of the insulating protection layer located in the seal area has a second thickness, and the first thickness is greater than the second thickness — 101 providing a second substrate, and the second substrate has a common electrode — 102 forming a seal on the first substrate or the second substrate, and the seal is doped with a conductor, and the seal corresponds to the signal trace — 103

FIG. 6

DISPLAY PANEL AND MANUFACTURING METHOD THEREOF

RELATED APPLICATIONS

This application is a Notional Phase of PCT Patent Application No. PCT/CN2021/111664 having international filing date of Aug. 10, 2021, which claims the benefit of priority of Chinese Patent Application No. 202110880621.3 filed on Aug. 2, 2021. The contents of the above applications are all incorporated by reference as if fully set forth herein in their entirety.

FIELD OF THE INVENTION

The present application relates to a display technology field, and more particularly to a display panel and a manufacturing method thereof.

BACKGROUND OF THE INVENTION

Liquid Crystal Display (LCD) is generally composed of an array substrate, a color filter substrate, and a liquid crystal layer and seal arranged between the two substrates. The array substrate and the color filter substrate are prepared, respectively. The array substrate and the color filter substrate are paired and assembled to form a cell. The seal layer is configured for sealing, and gold balls in the seal layer are configured to conduct the electrodes of the array substrate and the color filter substrate.

Specifically, the common voltage signal of the color filter substrate needs to be conducted from the traces of the array substrate through the gold balls in the seal. However, there are other insulating film layers on the traces, and openings need to be provided in the insulating film layers to realize the connection between the gold ball and the trace, which results in a significant difference in height between the opening position and the non-opening position. The requirements for the gold balls are high, which easily leads to instability of the common voltage signal.

SUMMARY OF THE INVENTION

The present application provides a display panel and a manufacturing method thereof, which reduce a height difference existing in the seal area, thereby reducing the requirement for the conductor, and improving the stability of the common voltage signal.

The present application provides a display panel, having an active area and a seal area arranged around the active area and including:
  a first substrate, having a signal trace and an insulating protection layer, and the signal trace is positioned in the seal area, and the insulation protection layer covers the signal trace, and the insulation protection layer has an opening, and the opening exposes the signal trace;
  a second substrate, oppositely arranged with the first substrate, and the second substrate has a common electrode; and
  a seal, positioned between the first substrate and the second substrate, and the seal covers the signal trace, the seal is doped with a conductor, and the conductor conducts the signal trace and the common electrode;
  wherein a portion of the insulating protection layer located in the active area has a first thickness, and a portion of the insulating protection layer located in the seal area has a second thickness, and the first thickness is greater than the second thickness.

Optionally, in some embodiments of the present application, the insulating protection layer includes an organic film layer, and the opening includes a first opening, and the first opening is located in the organic film layer and penetrates the organic film layer;
  the organic film layer includes a first portion and a second portion, and the first portion is located in the active area, and the second portion is located in the seal area, and a thickness of the first portion is greater than a thickness of the second portion.

Optionally, in some embodiments of the present application, the insulating protection layer further includes a passivation layer disposed on a side of the organic film layer close to the signal trace, and the passivation layer is located in the active area and the seal area, and the first opening penetrates the passivation layer.

Optionally, in some embodiments of the present application, the insulating protection layer further includes a gate insulating layer, and the first substrate further includes a transparent conductive layer;
  the gate insulating layer is located on a side of the passivation layer close to the signal trace, and the opening further includes a second opening being located in the gate insulating layer and penetrating the gate insulating layer, and the second opening corresponds to and communicates with the first opening, and the transparent conductive layer is located in the second opening, and the conductor is connected to the signal trace through the transparent conductive layer.

Optionally, in some embodiments of the present application, a thickness of the gate insulating layer is less than or equal to a sum of a thickness of the signal trace and a thickness of the transparent conductive layer.

Optionally, in some embodiments of the present application, the gate insulating layer includes a first gate insulating portion and a second gate insulating portion, and the first gate insulating portion is located in the active area, and the second gate insulating portion is located in the seal area, and a thickness of the first gate insulating portion is greater than a thickness of the second gate insulating portion.

Optionally, in some embodiments of the present application, the first substrate further includes a pixel electrode, and the pixel electrode and the transparent conductive layer are arranged in a same layer, and a thickness of the pixel electrode is less than a thickness of the transparent conductive layer.

Optionally, in some embodiments of the present application, the insulating protection layer further includes a passivation layer disposed on a side of the organic film layer close to the signal trace, and an end surface of the passivation layer close to the seal area is adjacent to the seal area.

Optionally, in some embodiments of the present application, the insulating protection layer further includes a gate insulating layer, and the first substrate further includes a transparent conductive layer;
  the gate insulating layer is located on a side of the passivation layer close to the signal trace, and the opening further includes a second opening being located in the gate insulating layer and penetrating the gate insulating layer, and the second opening corresponds to and communicates with the first opening, and the transparent conductive layer is located in the second opening, and the conductor is connected to the signal trace through the transparent conductive layer.

Optionally, in some embodiments of the present application, a thickness of the gate insulating layer is less than or equal to a sum of a thickness of the signal trace and a thickness of the transparent conductive layer.

Optionally, in some embodiments of the present application, the gate insulating layer includes a first gate insulating portion and a second gate insulating portion, and the first gate insulating portion is located in the active area, and the second gate insulating portion is located in the seal area, and a thickness of the first gate insulating portion is greater than a thickness of the second gate insulating portion.

Optionally, in some embodiments of the present application, the first substrate further includes a pixel electrode, and the pixel electrode and the transparent conductive layer are arranged in a same layer, and a thickness of the pixel electrode is less than a thickness of the transparent conductive layer.

Optionally, in some embodiments of the present application, the second substrate further includes a light-shielding layer;
the light-shielding layer is located on a side of the common electrode away from the first substrate and in the seal area, and the light-shielding layer includes a first light-shielding portion and a second light-shielding portion, and the first light-shielding portion is arranged corresponding to the opening, and the second light-shielding portion is arranged corresponding to a periphery of the opening, and a thickness of the first light-shielding portion is greater than a thickness of the second light-shielding portion.

Optionally, in some embodiments of the present application, the first substrate further includes an array substrate-side common electrode, and the array substrate-side common electrode is located in the seal area, and the array substrate-side common electrode and the signal trace are arranged in a same layer and spaced apart.

Optionally, in some embodiments of the present application, a planar structure of the signal trace and a planar structure of the array substrate-side common electrode are both grid-shaped.

Optionally, in some embodiments of the present application, the seal is further doped with a supporter, and a mass ratio of the supporter to the conductor is 1:1.5 to 1:4.

Correspondingly, the present application provides a manufacturing method of a display panel, having an active area and a seal area arranged around the active area, and the manufacturing method of the display panel includes:
providing a first substrate, and the first substrate has a signal trace and an insulating protection layer, and the signal trace is positioned in the seal area, and the insulation protection layer covers the signal trace, and the insulation protection layer has an opening, and the opening exposes the signal trace, and a portion of the insulating protection layer located in the active area has a first thickness, and a portion of the insulating protection layer located in the seal area has a second thickness, and the first thickness is greater than the second thickness;
providing a second substrate, and the second substrate has a common electrode;
forming a seal on the first substrate or the second substrate, and the seal is doped with a conductor, and the seal corresponds to the signal trace.

Optionally, in some embodiments of the present application, the insulating protection layer includes an organic film layer, and the step of providing the first substrate includes:
patterning the organic film layer to make the organic film layer include a first portion and a second portion, and the first portion is located in the active area, and the second portion is located in the seal area, and a thickness of the first portion is greater than a thickness of the second portion.

Optionally, in some embodiments of the present application, the step of patterning the organic film layer includes:
employing a single-slit mask, a gray tone mask or a halftone mask to pattern the organic film layer.

Optionally, in some embodiments of the present application, the first substrate further includes a gate insulating layer, and the gate insulating layer is arranged on a side of the organic film layer close to the signal trace, and the step of providing the first substrate includes:
patterning the gate insulating layer to make the gate insulating layer include a first gate insulating portion and a second gate insulating portion, and the first gate insulating portion is located in the active area, and the second gate insulating portion is located in the seal area, and a thickness of the first gate insulating portion is greater than a thickness of the second gate insulating portion.

The present application provides a display panel and a manufacturing method thereof. The display panel has an active area and a seal area arranged around the active area. The display panel includes a first substrate and a second substrate, which are oppositely arranged, and a seal located between the first substrate and the second substrate. The first substrate includes a signal trace and an insulating protection layer covering a common electrode. The insulating protection layer has an opening to expose the signal trace. The seal is doped with a conductor, and the conductor conducts the signal trace and the common electrode on the second substrate through the opening. A portion of the insulating protection layer located in the active area has a first thickness, and a portion of the insulating protection layer located in the seal area has a second thickness, and the first thickness is greater than the second thickness. The present application reduces the thickness of the insulating protection layer in the seal area and reduces the height difference between the opening and the periphery of the opening in the seal area, thereby reducing the requirement for conductor and improving the connection stability of the common voltage signal between the first substrate and the second substrate.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

FIG. 5 is a schematic diagram of a fourth structure of a display panel provided by the present application;

FIG. 6 is a schematic flowchart of a manufacturing method of the display panel provided by the present application.

DETAILED DESCRIPTION OF PREFERRED EMBODIMENTS

Figure 1:
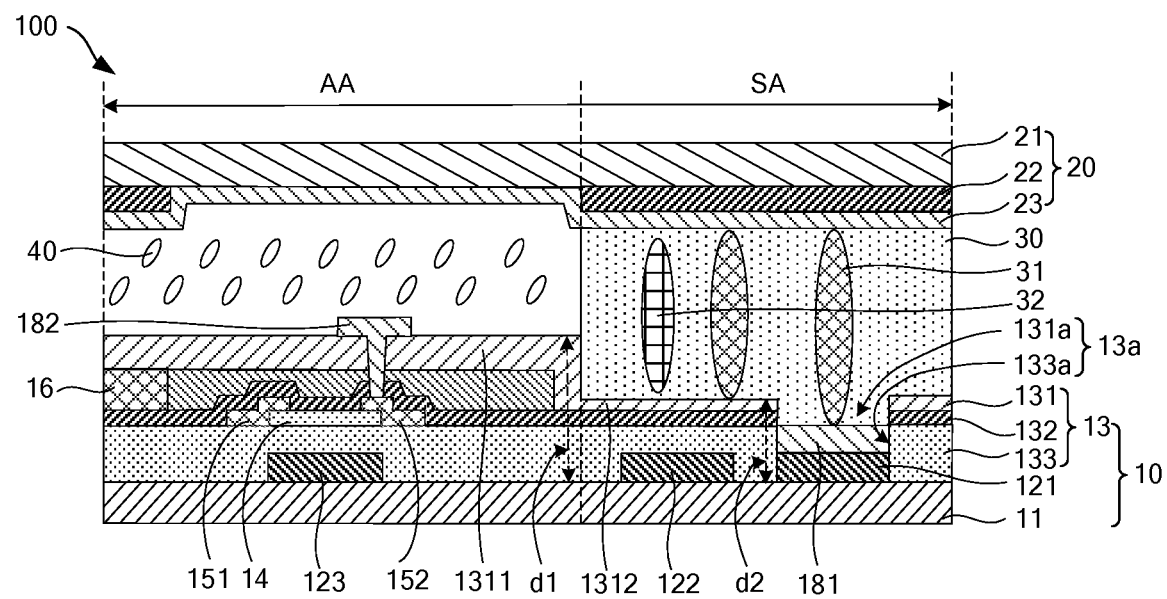
FIG. 1 is a schematic diagram of a first structure of a display panel provided by the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application. Besides, it should be understood that the specific embodiments described herein are merely for illustrating and explaining the present application and are not intended to limit the present application. In this application, if no explanation is made to the contrary, the orientation words used such as "upper", "lower", "left", "right" usually refer to the upper, lower, left and right of the device in actual use or working state, which specifically are the directions of the drawing in the figures.

The present application provides a display panel and a manufacturing method thereof, which will be described in detail below. It should be noted that the order of description in the following embodiments is not meant to limit the preferred order of the embodiments of the present application. In the foregoing embodiments, the description of the various embodiments have respective different emphases, and a part in some embodiment, which is not described in detail can be referred to the related description of other embodiments.

Please refer to FIG. 1. FIG. 1 is a schematic diagram of a first structure of a display panel provided by the present application. In the present application, the display panel 100 has an active area AA and a seal area SA arranged around the active area AA. The display panel 100 includes a first substrate 10 and a second substrate 20, which are oppositely arranged, and a seal 30 located between the first substrate 10 and the second substrate 20.

The first substrate 10 includes a signal trace 121 and an insulating protection layer 13. The signal trace 121 is located in the seal area SA. The insulating protection layer 13 covers the signal trace 121. The insulating protection layer 13 has an opening 13a. The opening 13a exposes the signal trace 121. The second substrate 20 has a common electrode 23. The seal 30 covers the signal trace 121. The seal 30 is doped with a conductor 31. The conductor 31 conducts the signal trace 121 and the common electrode 23. A portion of the insulating protection layer 13 located in the active area AA has a first thickness d1. A portion of the insulating protection layer 13 located in the seal area SA has a second thickness d2. The first thickness d1 is greater than the second thickness d2.

It can be understood that the conductor 31 in the seal 30 is configured to conduct the signal trace 121 and the common electrode 23 to transmit a common voltage signal to the second substrate 20. In order to ensure the stable transmission of the common voltage signal, in the present application, the conductor 31 is directly doped in the seal 30, which can increase a number of the conductor 31 and thereby increase the conductivity. Since the seal 30 is coated on the entire seal area SA, the conductors 31 are also distributed throughout the entire seal area SA. However, the opening 13a is provided on the insulating protection layer 13 located in the seal area SA. A height difference exists between the opening 13a and the periphery of the opening 13a. When the particle size of the conductors 31 doped in the seal 30 is certain and there is a larger height difference in the seal area SA, if the conductor 31 normally conducts the signal trace 121 and the common electrode 23 through the opening 13a, the conductor 31 located at the periphery of the opening 13a may be excessively compressed, which affects the cell thickness of the display panel 100. On the contrary, if the conductor 31 located at the periphery of the opening 13a is arranged normally, the conductor 31 may be too small in particle size to conduct the signal trace 121 and the common electrode 23 through the opening 13a. Therefore, there are higher requirements for the particle size and material compression rate of the conductor 31.

Thus, the present application reduces the thickness d2 of the insulating protection layer 13 in the seal area SA and reduces the height difference between the opening 13a and the periphery of the opening 13a in the seal area SA. Thereby, the requirement on the conductor 31 is reduced, so that the conductor 31 can fully contact the signal trace 121 and the common electrode 23 within an effective compression rate, and improve the connection stability of the common voltage signal between the first substrate 10 and the second substrate 20.

In the present application, the first substrate 10 is an array substrate. The second substrate 20 is a color filter substrate. The liquid crystal 40 is filled between the first substrate 10 and the second substrate 20. The seal 30 is used to seal the liquid crystal 40.

The first substrate 10 further includes a first base substrate 11, an array substrate-side common electrode 122, a thin film transistor, a color resist layer 16 and a pixel electrode 182. The thin film transistor includes a gate 123, a semiconductor 14, a source 151 and a drain 152. The pixel electrode 182 is connected to the drain 152 through a via hole. The color resist layer 16 includes, but is not limited to, a red resist, a green resist and a blue resist.

Figure 2:
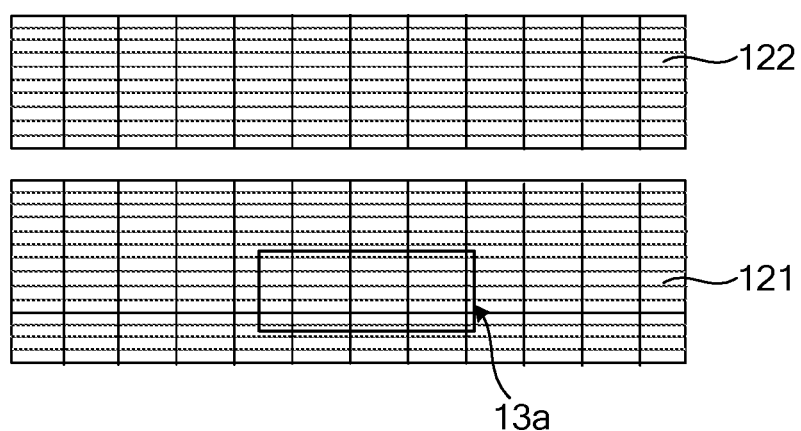
FIG. 2 is a schematic diagram of a partial planar structure of a seal area of the display panel provided by the present application.

Please refer to FIG. 2. FIG. 2 is a schematic diagram of a partial planar structure of a seal area of the display panel provided by the present application. As shown in FIG. 2, a planar structure of the signal trace 121 and a planar structure of the array substrate-side common electrode 122 are both grid-shaped. It can be understood that after assembling the first substrate 10 and the second substrate 20 for cell, the seal needs to be cured. In this application, the signal trace 121 and the array substrate-side common electrode 122 are arranged in a grid structure. When the seal is photo cured or thermally cured from the side of the first substrate 10, light can better pass through the signal trace 121 and the array substrate-side common electrode 122 to cure the seal 30, thereby increasing the curing rate.

It should be noted that the present application does not limit the structure of the thin film transistor, which may be a top-gate thin film transistor or the bottom-gate thin film transistor shown in FIG. 1. It may be a single-gate thin film transistor as shown in FIG. 1 or a double-gate thin film transistor. FIG. 1 is only an illustration and cannot be considered as the limitation of the present application.

The present application adopts COA (Color-filter On Array, color filter formed on array substrate) technology, the color resist layer 16 is directly fabricated on the thin film transistor of the first substrate 10, which can effectively solve the problem of light leakage caused by the misalignment in the cell process of the display panel 100, and can significantly improve the aperture ratio of the display panel 100.

In the present application, the signal trace 121 is usually a metal line with a width of several tens of micrometers and a thickness of several hundreds of micrometers. The signal trace 121, the array substrate-side common electrode 122 and the gate 123 are arranged in the same layer. The signal trace 121 can be made of any one of silver (Ag), aluminum (Al), nickel (Ni), chromium (Cr), molybdenum (Mo), copper (Cu), tungsten (W) and titanium (Ti). The aforesaid metals possess good conductivity and low cost, which can reduce the production cost while ensuring the conductivity of the signal trace 121.

In the present application, the material of the seal 30 is obtained by mixing the conductor 31 and the seal material in a certain mass ratio. The seal material can be epoxy resin, which possesses insulating properties. The conductor 31 is mainly formed by mixing gold balls and seal. The gold ball used as conductive filler, the inner layer is a spherical and elastic polymer material with uniform particle size, and the outer layer is coated with nickel, and then a layer of gold is plated on the nickel surface by electroless plating, or here a silver layer is used instead of the nickel layer and the gold layer to form conductive particles. The polymer material in the conductor 31 may be one or a combination of polystyrene, polyaniline, polypyrrole, polythiophene and polyacrylic resin microspheres.

In the present application, the seal 30 further a supporter 32. The supporter 32 functions to support the first substrate 10 and the second substrate 20 and maintain the cell gap. The supporter 32 may be a silicon ball. In the present application, a mass ratio of the supporter 32 to the conductor 31 is 1:1.5 to 1:4. For instance, a mass ratio of the supporter 32 to the conductor 31 is 1:2. While ensuring good conduction between the signal trace 121 and the common electrode 23, the cell gap can be effectively maintained.

In the present application, the second substrate 20 further includes a second base substrate 21 and a light-shielding layer 22. The light-shielding layer 22 is located on a side of the common electrode 23 away from the first substrate 10. In the active area AA, the light-shielding layer 22 is located between adjacent color resist to prevent color mixing. In the seal area SA, the light-shielding layer 22 covers the seal 30 to prevent light leakage in the seal area SA.

Please continue referring to FIG. 1. In the present application, the insulating protection layer 13 includes an organic film layer 131. The organic film layer 131 covers the signal trace 121. The opening 13a includes a first opening 131a. The first opening 131a is disposed in the organic film layer 131 and penetrates the organic film layer 131. The first opening 131a is disposed corresponding to the signal trace 121. The organic film layer 131 includes a first portion 1311 and a second portion 1312. The first portion 1311 is located in the active area AA. The second portion 1312 is located in the seal area SA. A thickness of the first portion 1311 is greater than a thickness of the second portion 1312.

Specifically, the organic film layer 131 is disposed on the color resist layer 16. It is understandable that as the size of the display panel 100 increases, the display brightness unevenness caused by the poor uniformity of the cell gap will become more obvious. Therefore, an organic film layer 131 is provided on the first substrate 10 to change the flatness of the film layer underneath and prevent the electric field from interfering with each other, thereby effectively improving display unevenness caused by uneven appearance factor, reducing the parasitic capacitance, and improving the quality of the display panel 100.

The organic film layer 131 is usually a transparent organic material to facilitate the passage of the backlight. For instance, a material of the organic film layer 131 is soluble Polyfluoroalkoxy (PFA) with good chemical resistance and high temperature resistance. Since the thickness of the organic film layer 131 is relatively thick, after the first opening 131a is provided in the second portion 1312, it is easy to form a larger height difference between the opening 131a and the periphery of the opening 131a in the seal area SA.

In the present application, the thickness of the first portion 1311 is greater than the thickness of the second portion 1312. Namely, a single-slit mask, a halftone mask or a gray tone mask is used. While forming the first opening 131a, the thickness of the second portion 1312 is reduced, thereby reducing the second thickness d2 of the portion of the insulating protection layer 13 located in the seal area SA. Thereby, the height difference between the opening 13a and the periphery of the opening 13a is reduced, so that the conductor 31 can fully contact the signal trace 121 and the common electrode 23 within an effective compression rate, and improve the connection stability of the common voltage signal between the first substrate 10 and the second substrate 20.

Furthermore, the insulating protection layer 13 further includes a passivation layer 132 and a gate insulating layer 133. The passivation layer 132 is disposed on a side of the organic film layer 131 close to the signal trace 121. The gate insulating layer 133 is disposed on a side of the passivation layer 132 close to the signal trace 121.

Specifically, the gate insulating layer 133 is located between the gate 123 and the semiconductor 14 and covers the signal trace 121, the array substrate-side common electrode 122 and the gate 123. The passivation layer 132 is located between the source 151 (drain 152) and the color resist layer 16 and covers the source 151, the drain 152 and the semiconductor 14. In the present application, the passivation layer 132 and the organic film layer 131 are usually patterned with the same process to simplify the manufacturing process. Therefore, when the organic film layer 131 includes the first portion 1311 and the second portion 1312, the passivation layer 132 is also located in the active area AA and the seal area SA to function for blocking water and oxygen.

Certainly, in some embodiments, the organic film layer 131 and the passivation layer 132 may also be patterned separately. Then, the thickness of the portion of the passivation layer 132 located in the seal area SA can be reduced to reduce the second thickness d2 of the insulating protection layer 13 located in the seal area SA, and further reduce the height difference existing in the seal area SA.

The opening 13a further includes a second opening 133a. The second opening 133a is disposed in the gate insulating layer 133. The second opening 133a penetrates the gate insulating layer 133. The first opening 131a penetrates the organic film layer 131 and the passivation layer 132. The first opening 131a and the second opening 133a correspond to and communicate with each other, to expose a side surface of the signal trace 121 away from the first base substrate 11.

A material of the passivation layer 132 and the gate insulating layer 133 can be selected from one or more combinations of inorganic materials, such as aluminum oxide, silicon oxide, silicon nitride, silicon oxynitride, silicon carbide, titanium oxide, zirconium oxide and zinc oxide.

The materials of the passivation layer 132 and the gate insulating layer 133 can be the same or different.

Moreover, the first substrate 10 further includes a transparent conductive layer 181. The transparent conductive layer 181 and the pixel electrode 182 are arranged in the same layer. The same layer arrangement refers to the formation of the same process.

The transparent conductive layer 181 is disposed in the second opening 133a. The conductor 31 is connected to the signal trace 121 with the transparent conductive layer 181.

A material used for the transparent conductive layer 181 can be any of transparent metal oxide materials, such as indium tin oxide (ITO), indium zinc oxide (IZO), indium aluminum zinc oxide (IAZO), antimony tin oxide (ATO), zinc oxide (ZnO), etc.

In the present application, by providing the transparent conductive layer 181 with high conductivity, the contact resistance between the conductor 31 and the signal trace 121 can be reduced, and the conductivity between the signal trace 121 and the common electrode 23 can be enhanced. Besides, due to the arrangement of the transparent conductive layer 181, the height difference between the opening 13a and the periphery of the opening 13a is further reduced.

Furthermore, in the present application, a thickness of the gate insulating layer 133 is less than or equal to a sum of a thickness of the signal trace 121 and a thickness of the transparent conductive layer 181.

It can be understood that, in the display panel 100, the gate 123 and the pixel electrode 182 are both used to transmit signals required for display. Therefore, the thicknesses of the gate 123 and the pixel electrode 182 possess specifications. The signal trace 121 and the gate 123 are arranged in the same layer, and the transparent conductive layer 181 and the pixel electrode 182 are arranged in the same layer. Therefore, the thickness of the signal trace 121 and the transparent conductive layer 181 is usually certain.

Therefore, in the present application, the thickness of the gate insulating layer 133 can be designed to be equal to the sum of the thickness of the signal trace 121 and the thickness of the transparent conductive layer 181, so that the surface of the transparent conductive layer 181 away from the signal trace 121 and the surface of the gate insulating layer 133 away from the signal trace 121 are located on the same horizontal line. Or, the thickness of the gate insulating layer 133 is designed to be less than the sum of the thickness of the signal trace 121 and the thickness of the transparent conductive layer 181. Then, in the direction perpendicular to the plane where the first substrate 10 is located, the surface of the transparent conductive layer 181 away from the signal trace 121 is higher than the surface of the gate insulating layer 133 away from the signal trace 121. Thus, the height difference between the opening 13a and the periphery of the opening 13a is further reduced.

Certainly, in some embodiments, a single-slit mask, a halftone mask, or a gray tone mask may be used to control the thickness of the pixel electrode 182 and the thickness of the transparent conductive layer 181, respectively. Namely, while ensuring the thickness of the pixel electrode 182, the thickness of the transparent conductive layer 181 is arranged to be greater than the thickness of the pixel electrode 182, so that the thickness of the gate insulating layer 133 is less than or equal to the sum of the thickness of the signal trace 121 and the thickness of the transparent conductive layer 181.

Figure 3:
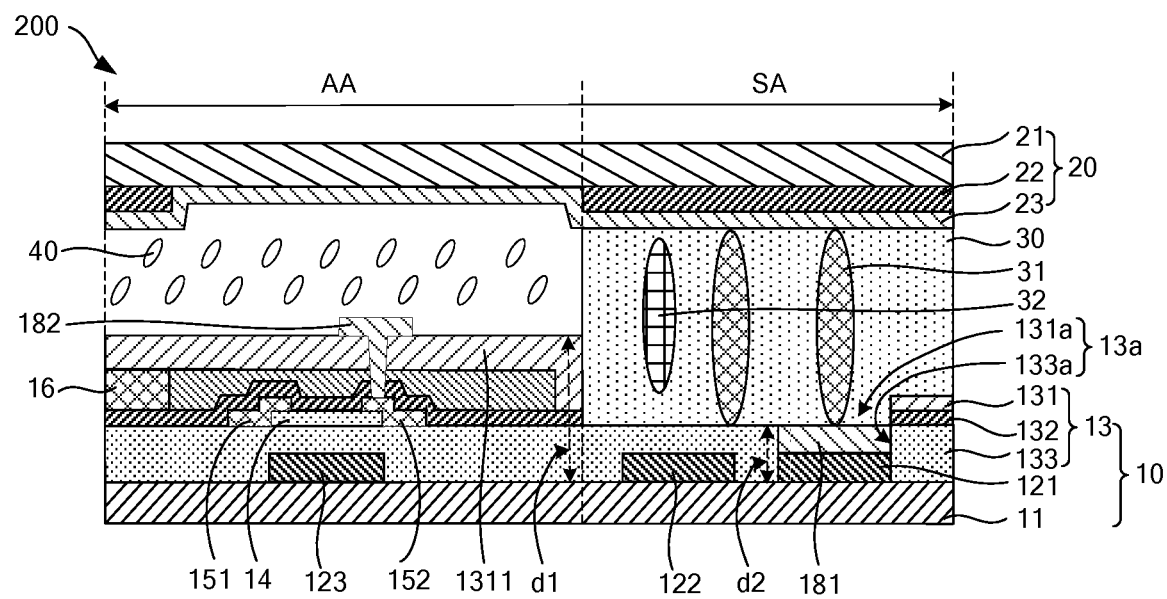
FIG. 3 is a schematic diagram of a second structure of a display panel provided by the present application.

Please refer to FIG. 3. FIG. 3 is a schematic diagram of a second structure of a display panel provided by the present application. The difference from the display panel 100 in the foregoing embodiment is that in the display panel 200 of this embodiment, an end surface of the passivation layer 132 close to the seal area SA is adjacent to the seal area SA. That is, the passivation layer 132 is arranged only in the active area AA to eliminate the portion of the passivation layer 132 located in the seal area SA.

It can be understood that in the present application, the passivation layer 132 and the organic film layer 131 are patterned with the same process to simplify the manufacturing process. Thus, in this embodiment, the organic film layer 131 merely includes the first portion 1311, and the portion of the organic film layer 131 located in the seal area SA is removed.

Certainly, if the organic film layer 131 and the passivation layer 132 are patterned separately, the first portion 1311 of the organic film layer 131 can be reserved, and the portion of the passivation layer 132 under the first portion 1311 can be removed.

In this embodiment, by completely removing the organic film layer 131 and the passivation layer 132 in the seal area SA, the second thickness d2 of the insulating protection layer 13 in the seal area SA is greatly reduced, thereby ensuring the cell gap uniformity of the seal area SA. In this embodiment, the conductor 31 can fully contact the signal trace 121 and the common electrode 23 within an effective compression rate, and improve the connection stability of the common voltage signal between the first substrate 10 and the second substrate 20.

Figure 4:
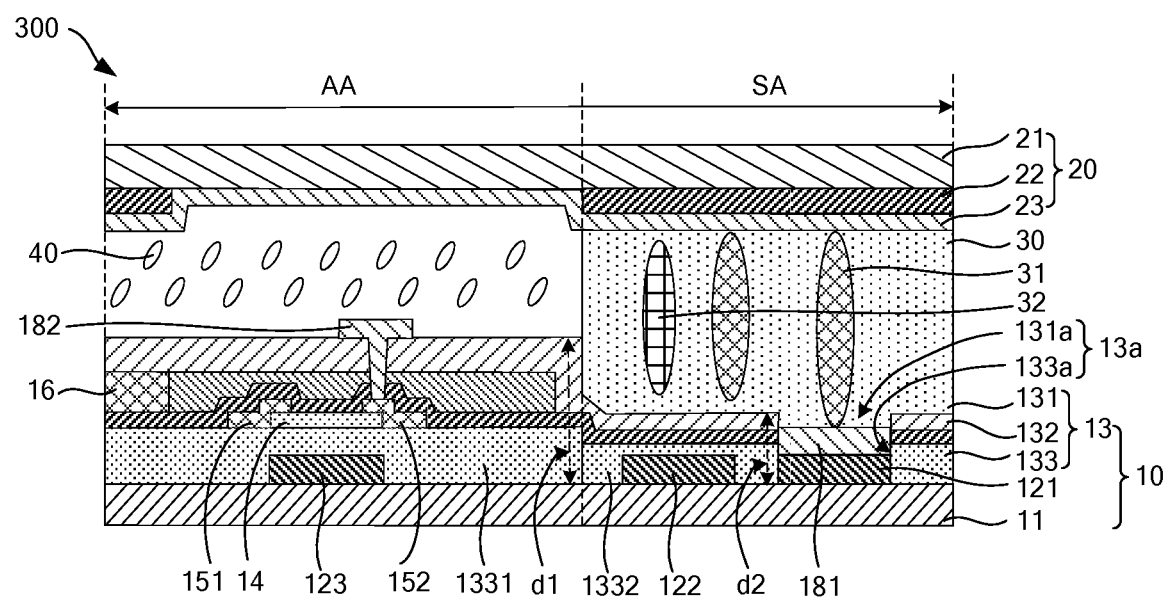
FIG. 4 is a schematic diagram of a third structure of a display panel provided by the present application.

Please refer to FIG. 4. FIG. 4 is a schematic diagram of a third structure of a display panel provided by the present application. The difference from the display panel 100 in the foregoing embodiments is that in the display panel 300 of this embodiment, the gate insulating layer 133 includes a first gate insulating portion 1331 and a second gate insulating portion 1332. The first gate insulating portion 1331 is located in the active area AA. The second gate insulating portion 1332 is located in the seal area SA. A thickness of the first gate insulating portion 1331 is greater than a thickness of the second gate insulating portion 1332.

In the present application, the thickness of the first gate insulating portion 1331 is greater than the thickness of the second gate insulating portion 1332. Namely, the gate insulating layer 133 is patterned by using a single-slit mask, a halftone mask or a gray tone mask to reduce the thickness of the second gate insulating portion 1332 while forming the second opening 133a, thus the thickness of the portion of the insulating protection layer 13 located in the seal area SA is reduced. Thereby, the height difference between the opening 13a and the periphery of the opening 13a is reduced, so that the conductor 31 can fully contact the signal trace 121 and the common electrode 23 within an effective compression rate, and improve the connection stability of the common voltage signal between the first substrate 10 and the second substrate 20.

Please refer to FIG. 5. FIG. 5 is a schematic diagram of a fourth structure of a display panel provided by the present application. The difference from the display panel 100 in the foregoing embodiments is that in the display panel 400 of this embodiment, in the seal area SA, the light-shielding layer 22 includes a first light-shielding portion 221 and a second light-shielding portion 222. The first light-shielding portion 221 is arranged corresponding to the opening 13a. The second light-shielding portion 222 is arranged corresponding to a periphery of the opening 13a. A thickness of the first light-shielding portion 221 is greater than a thickness of the second light-shielding portion 222.

It can be understood that since the thickness of the first light-shielding portion 221 is greater than the thickness of the second light-shielding portion 222, the distance between the common electrode 23 and the transparent conductive layer 181 can be reduced to compensate for the level difference caused by the opening 13a. Thus, the height difference between the opening 13a and the periphery of the opening 13a is reduced, so that the conductor 31 can fully contact the signal trace 121 and the common electrode 23 within an effective compression rate, and improve the connection stability of the common voltage signal between the first substrate 10 and the second substrate 20.

Correspondingly, the present application further provides a manufacturing method of a display panel. For details, please refer to FIG. 1 and FIG. 6. FIG. 6 shows a manufacturing method of the display panel provided by the present application. The display panel 100 has an active area AA and a seal area SA arranged around the active area AA. The manufacturing method of a display panel 100, including steps of:

Step 101, providing a first substrate, and the first substrate has a signal trace and an insulating protection layer, and the signal trace is positioned in the seal area, and the insulation protection layer covers the signal trace, and the insulation protection layer has an opening, and the opening exposes the signal trace, and a portion of the insulating protection layer located in the active area has a first thickness, and a portion of the insulating protection layer located in the seal area has a second thickness, and the first thickness is greater than the second thickness.

Specifically, the first substrate 10 is an array substrate. The first substrate 10 includes a first base substrate 11. A first metal layer is sputter deposited on the first base substrate 11. The first metal layer is patterned to form a signal trace 121, an array substrate-side common electrode 122 and a gate 123. The signal trace 121 and the array substrate-side common electrode 122 are located in the seal area SA. The gate 123 is located in the active area AA. Then, a gate insulating layer 133 is formed on the gate 123 by using a chemical vapor deposition method. The gate insulating layer 133 is patterned to form a second opening 133a. The second opening 133a exposes a side surface of the signal trace 121 away from the first base substrate 11. Then, a semiconductor 14, a source 151 and a drain 152 are sequentially formed on the gate insulating layer 133. A passivation layer 132 is formed on the source 151 and the drain 152 by using a chemical vapor deposition method. The passivation layer 132 covers the semiconductor 14, the source 151, the drain 152, the signal trace 121 and the gate insulating layer 133. The color resist layer 16 is formed on the passivation layer 132 with multiple times of coating, exposure and development. The color resist layer 16 is located in the active area AA. A PFA material is coated on the color resist layer 16 by spin coating or slit coating to form an organic film layer 131. The organic film layer 131 is patterned to have a first opening 131a. The first opening 131a penetrates the organic film layer 131 and the passivation layer 132. The first opening 131a and the second opening 133a correspond to and communicate with each other, to expose the signal trace 121.

Specifically, a Single-Slit Mask (SSM), a Gray-Tone Mask (GTM) or a Half-Tone Mask (HTM) can be used to pattern the organic film layer 131 to have the first opening 131a. The first opening 131a penetrates the organic film layer 131 and the passivation layer 132. Meanwhile, the organic film layer 131 includes a first portion 1311 and a second portion 1312, and the first portion 1311 is located in the active area AA. The second portion 1312 is located in the seal area SA. A thickness of the first portion 1311 is greater than a thickness of the second portion 1312.

Specifically, the present application utilizes a single-slit mask to pattern the organic film layer 131 as an example for description, but it cannot be considered as a limitation of the present application.

Specifically, a photoresist layer is formed on a side of the organic film layer 131 away from the first base substrate 11. A single-slit mask is provided on the photoresist layer. The single-slit mask has an opening in the area corresponding to the signal trace 121, and has a slit in the seal area SA outside of the signal trace 121. The slit here refers to a slit with a width equivalent to the wavelength of the utilized light. The light is diffracted as passing through the slits, and the photoresist under the area is uniformly half exposed due to interference under the area. The opening here refers to a gap whose width is much larger than the wavelength of the light. As the light passes through the opening, the diffraction phenomenon is not obvious, and the photoresist under the opening is completely exposed. Thus, the photoresist layer is formed into a fully exposed area, a partially exposed area and an unexposed area. The fully exposed area corresponds to the signal trace 121. The partially exposed area corresponds to the other area of the seal area SA. The unexposed area corresponds to the active area AA. The thickness of the photoresist layer in the unexposed area is greater than the thickness of the photoresist layer in the partially exposed area. The organic film layer 131 and the passivation layer 132 under the fully exposed area are continuously etched by an etching process to form the first opening 131a. Then, ashing treatment is implemented on the partially exposed area of the photoresist layer, and a portion of the organic film layer 131 under the partially exposed area is continuously etched by an etching process to reduce the thickness of the second portion 1312 of the organic film layer 131.

In some embodiments, it is also possible to control the etching thickness to completely etch away the second portion 1312 and etch away a portion of the passivation layer 132 below.

It should be noted that the present application takes a positive photoresist as an example for description, but it cannot be considered as a limitation of the present application.

In the present application, the foregoing single-slit mask, gray tone mask or halftone mask may also be used to pattern the gate insulating layer 133, the passivation layer 132, etc., to reduce the height of the seal area SA. The repeated description is omitted here.

Step 102, providing a second substrate, and the second substrate has a common electrode.

Specifically, the second substrate 20 is a color filter substrate. First, a second base substrate 21 is provided. Then, a light-shielding layer 22 is formed on the second base substrate 21. The light-shielding layer 22 is patterned. After patterning, in the active area AA, the light-shielding layer 22 is located between adjacent color resist to prevent color mixing. In the seal area SA, the light-shielding layer 22 covers the seal 30 to prevent light leakage in the seal area SA.

Furthermore, a common electrode 23 is formed on the light-shielding layer 22. The common electrode 23 may be formed as a film on the entire surface of the second substrate 20. The common electrode 23 can also be patterned according to the structure of the pixel electrode 182 on the first substrate 10, which is not specifically limited here.

The foregoing single-slit mask, gray tone mask or halftone mask may also be used to pattern light-shielding layer 22, to reduce the height of the seal area SA. The repeated description is omitted here.

Step 103, forming a seal on the first substrate or the second substrate, and the seal is doped with a conductor, and the seal corresponds to the signal trace.

It should be noted that the present application takes forming a seal 30 on the first substrate 10 as an example for description, but it cannot be considered as a limitation of the present application.

Specifically, a seal material is coated on the first substrate 10 to form the seal 30. The seal 30 covers at least a portion of the signal trace 121 to realize the connection between the conductor 31 and the signal trace 121. For the material of the seal 30 and the material of the conductor 31, please refer to the aforementioned embodiments, which will not be repeated here.

At last, a liquid crystal dropping device can be employed to drop an appropriate amount of liquid crystal 40 in the enclosed structure enclosed by the seal 30 to form a liquid crystal layer. The second substrate 20 is bonded to the first substrate 10 in a vacuum environment, and the seal is hardened and fixed by ultraviolet light irradiation and thermal curing (seal molding), thereby obtaining the display panel in any of the aforesaid embodiments.

The present application provides a manufacturing method of a display panel. The insulating protection layer 13 is patterned through a single-slit mask, a halftone mask or a gray tone mask to reduce the thickness d2 of the insulating protection layer 13 in the seal area SA and thus to reduce the height difference between the opening 13a and the periphery of the opening 13a in the seal area SA. Thus, the requirement on the conductor 31 is reduced, so that the conductor 31 can fully contact the signal trace 121 and the common electrode 23 within an effective compression rate, and improve the connection stability of the common voltage signal between the first substrate 10 and the second substrate 20.

The display panel and the manufacturing method provided by the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A display panel, having an active area and a seal area arranged around the active area and including:
   a first substrate, having a signal trace and an insulating protection layer, and the signal trace is positioned in the seal area, and the insulation protection layer covers the signal trace, and the insulation protection layer has an opening, and the opening exposes the signal trace;
   a second substrate, oppositely arranged with the first substrate, and the second substrate has a common electrode; and
   a seal, positioned between the first substrate and the second substrate, and the seal covers the signal trace, the seal is doped with a conductor, and the conductor conducts the signal trace and the common electrode at the opening;
   wherein a portion of the insulating protection layer located in the active area has a first thickness, and a portion of the insulating protection layer located in the seal area has a second thickness, and the first thickness is greater than the second thickness;
   wherein the first substrate further includes an array substrate-side common electrode, and the array substrate-side common electrode is located in the seal area, and the array substrate-side common electrode and the signal trace are arranged in a same layer and spaced apart;
   wherein the insulating protection layer includes an organic film layer, and the opening includes a first opening, and the first opening is disposed corresponding to the signal trace and penetrates the organic film layer;
   the organic film layer includes a first portion and a second portion, and the first portion is located in the active area, and the second portion is located in the seal area, and a thickness of the first portion is greater than a thickness of the second portion;
   wherein the insulating protection layer further includes a passivation layer disposed on a side of the organic film layer close to the signal trace, and the passivation layer is located in the active area and the seal area, and the first opening penetrates the passivation layer;
   wherein the insulating protection layer further includes a gate insulating layer, and the first substrate further includes a transparent conductive layer;
   the gate insulating layer is located on a side of the passivation layer close to the signal trace, and the opening further includes a second opening being located in the gate insulating layer and penetrating the gate insulating layer, and the second opening corresponds to and communicates with the first opening, and the transparent conductive layer is entirely located in the second opening, and the conductor is connected to the signal trace through the transparent conductive layer.

2. The display panel according to claim 1, wherein a thickness of the gate insulating layer is less than or equal to a sum of a thickness of the signal trace and a thickness of the transparent conductive layer.

3. The display panel according to claim 1, wherein the gate insulating layer includes a first gate insulating portion and a second gate insulating portion, and the first gate insulating portion is located in the active area, and the second gate insulating portion is located in the seal area, and a thickness of the first gate insulating portion is greater than a thickness of the second gate insulating portion.

4. The display panel according to claim 1, wherein the first substrate further includes a pixel electrode, and the pixel electrode and the transparent conductive layer are arranged in a same layer, and a thickness of the pixel electrode is less than a thickness of the transparent conductive layer.

5. The display panel according to claim 1, wherein the second substrate further includes a light-shielding layer;
   the light-shielding layer is located on a side of the common electrode away from the first substrate and in the seal area, and the light-shielding layer includes a first light-shielding portion and a second light-shielding portion, and the first light-shielding portion is arranged corresponding to the opening, and the second light-shielding portion is arranged corresponding to a periphery of the opening, and a thickness of the first light-shielding portion is greater than a thickness of the second light-shielding portion.

6. The display panel according to claim 1, wherein a planar structure of the signal trace and a planar structure of the array substrate-side common electrode are both grid-shaped.

7. The display panel according to claim 1, wherein the seal is further doped with a supporter, and a mass ratio of the supporter to the conductor is 1:1.5 to 1:4.

8. A manufacturing method of a display panel, having an active area and a seal area arranged around the active area, and the manufacturing method of the display panel includes:
providing a first substrate, and the first substrate has a signal trace and an insulating protection layer, and the signal trace is positioned in the seal area, and the insulation protection layer covers the signal trace, and the insulation protection layer has an opening, and the opening exposes the signal trace, and a portion of the insulating protection layer located in the active area has a first thickness, and a portion of the insulating protection layer located in the seal area has a second thickness, and the first thickness is greater than the second thickness, the first substrate has an array substrate-side common electrode, and the array substrate-side common electrode is located in the seal area, and the array substrate-side common electrode and the signal trace are arranged in a same layer and spaced apart;
providing a second substrate, and the second substrate has a common electrode;
forming a seal on the first substrate or the second substrate, and the seal is doped with a conductor, the seal corresponds to the signal trace, and the conductor conducts the signal trace and the common electrode at the opening;
wherein the insulating protection layer includes an organic film layer, and the opening includes a first opening, and the first opening is disposed corresponding to the signal trace and penetrates the organic film layer;
the organic film layer includes a first portion and a second portion, and the first portion is located in the active area, and the second portion is located in the seal area, and a thickness of the first portion is greater than a thickness of the second portion;
wherein the insulating protection layer further includes a passivation layer disposed on a side of the organic film layer close to the signal trace, and the passivation layer is located in the active area and the seal area, and the first opening penetrates the passivation layer;
wherein the insulating protection layer further includes a gate insulating layer, and the first substrate further includes a transparent conductive layer;
the gate insulating layer is located on a side of the passivation layer close to the signal trace, and the opening further includes a second opening being located in the gate insulating layer and penetrating the gate insulating layer, and the second opening corresponds to and communicates with the first opening, and the transparent conductive layer is entirely located in the second opening, and the conductor is connected to the signal trace through the transparent conductive layer.

9. The manufacturing method of the display panel according to claim 8, wherein the insulating protection layer includes an organic film layer, and the step of providing the first substrate includes:
patterning the organic film layer to make the organic film layer include a first portion and a second portion, and the first portion is located in the active area, and the second portion is located in the seal area, and a thickness of the first portion is greater than a thickness of the second portion.

10. The manufacturing method of the display panel according to claim 9, wherein the step of patterning the organic film layer includes:
employing a single-slit mask, a gray tone mask or a halftone mask to pattern the organic film layer.

11. The manufacturing method of the display panel according to claim 9, wherein the first substrate further includes a gate insulating layer, and the gate insulating layer is arranged on a side of the organic film layer close to the signal trace, and the step of providing the first substrate includes:
patterning the gate insulating layer to make the gate insulating layer include a first gate insulating portion and a second gate insulating portion, and the first gate insulating portion is located in the active area, and the second gate insulating portion is located in the seal area, and a thickness of the first gate insulating portion is greater than a thickness of the second gate insulating portion.

12. A display panel, having an active area and a seal area arranged around the active area and including:
a first substrate, having a signal trace and an insulating protection layer, and the signal trace is positioned in the seal area, and the insulation protection layer covers the signal trace, and the insulation protection layer has an opening, and the opening exposes the signal trace;
a second substrate, oppositely arranged with the first substrate, and the second substrate has a common electrode; and
a seal, positioned between the first substrate and the second substrate, and the seal covers the signal trace, the seal is doped with a conductor, and the conductor conducts the signal trace and the common electrode at the opening;
wherein a portion of the insulating protection layer located in the active area has a first thickness, and a portion of the insulating protection layer located in the seal area has a second thickness, and the first thickness is greater than the second thickness;
wherein the first substrate further includes an array substrate-side common electrode, and the array substrate-side common electrode is located in the seal area, and the array substrate-side common electrode and the signal trace are arranged in a same layer and spaced apart;
wherein the insulating protection layer includes an organic film layer, and the opening includes a first opening, and the first opening is disposed corresponding to the signal trace and penetrates the organic film layer;
the organic film layer includes a first portion and a second portion, and the first portion is located in the active area, and the second portion is located in the seal area, and a thickness of the first portion is greater than a thickness of the second portion;
wherein the insulating protection layer further includes a passivation layer disposed on a side of the organic film layer close to the signal trace, and an end surface of the passivation layer close to the seal area is adjacent to the seal area;
wherein the insulating protection layer further includes a gate insulating layer, and the first substrate further includes a transparent conductive layer;

the gate insulating layer is located on a side of the passivation layer close to the signal trace, and the opening further includes a second opening being located in the gate insulating layer and penetrating the gate insulating layer, and the second opening corresponds to and communicates with the first opening, and the transparent conductive layer is entirely located in the second opening, and the conductor is connected to the signal trace through the transparent conductive layer.

13. The display panel according to claim 12, wherein a thickness of the gate insulating layer is less than or equal to a sum of a thickness of the signal trace and a thickness of the transparent conductive layer.

14. The display panel according to claim 12, wherein the gate insulating layer includes a first gate insulating portion and a second gate insulating portion, and the first gate insulating portion is located in the active area, and the second gate insulating portion is located in the seal area, and a thickness of the first gate insulating portion is greater than a thickness of the second gate insulating portion.

15. The display panel according to claim 12, wherein the first substrate further includes a pixel electrode, and the pixel electrode and the transparent conductive layer are arranged in a same layer, and a thickness of the pixel electrode is less than a thickness of the transparent conductive layer.

\* \* \* \* \*